United States Patent
Allen, Jr. et al.

(10) Patent No.: US 6,231,054 B1
(45) Date of Patent: May 15, 2001

(54) ELASTOMERIC SLIDING SEAL FOR VACUUM BELLOWS

(75) Inventors: Ernest E. Allen, Jr., Rockport; Robert J. Mitchell, Saugus; Perry J. I. Justesen, Beverly; Alexander F. Pless, Rockport, all of MA (US)

(73) Assignee: Axcelis Technologies, Inc., Beverly, MA (US)

( * ) Notice: Subject to any disclaimer, the term of this patent is extended or adjusted under 35 U.S.C. 154(b) by 0 days.

(21) Appl. No.: 09/217,383

(22) Filed: Dec. 21, 1998

(51) Int. Cl.[7] .......................................................... F16J 3/00
(52) U.S. Cl. .............................................................. 277/634
(58) Field of Search ...................................... 277/315, 391, 277/393, 634, 636, 945; 403/50, 51; 464/173, 175

(56) References Cited

U.S. PATENT DOCUMENTS

| | | |
|---|---|---|
| 3,106,414 | 10/1963 | Peters et al. . |
| 3,692,337 | 9/1972 | Mischel . |
| 3,770,303 | 11/1973 | Hallett . |
| 3,773,087 | 11/1973 | Katayama . |
| 3,915,482 | 10/1975 | Fletcher et al. . |
| 4,072,329 | 2/1978 | Mutchler . |
| 4,345,772 | * 8/1982 | Woody et al. ...................... 403/50 X |
| 4,791,963 | 12/1988 | Gronert et al. . |
| 5,195,563 | 3/1993 | Brooks . |
| 5,375,854 | 12/1994 | Carlisle et al. . |
| 5,639,098 | * 6/1997 | MacDonald ...................... 277/391 X |
| 5,656,092 | * 8/1997 | Blake et al. . |

* cited by examiner

*Primary Examiner*—Anthony Knight
*Assistant Examiner*—Karlena D. Schwing
(74) *Attorney, Agent, or Firm*—John A. Kastelic

(57) ABSTRACT

An improved bellows assembly (18) is provided for use in, for example, an ion implanter (10). The bellows assembly comprises a first mounting portion (56) located at one end of the bellows assembly for fixedly mounting the bellows assembly to a first vacuum chamber (16); a second mounting portion (54) located at an opposite end of the bellows assembly for slidably mounting the bellows assembly to a second vacuum chamber (15); and a steel bellows (60) located between the first and second mounting portions. The bellows extends generally along a longitudinal axis (64) and is expansible and contractible along this axis. The second mounting portion permits radial slidable movement of the bellows assembly with respect to the second chamber in a first plane substantially perpendicular to this axis. The second mounting portion comprises a first sliding plate (74) having a first wear plate (78), a second sliding plate (76) having a second wear plate (80), and an elastomeric seal (82) for maintaining a vacuum condition at the slidable mating surface provided between the first and second wear plates.

15 Claims, 2 Drawing Sheets

ELASTOMERIC SLIDING SEAL FOR VACUUM BELLOWS

RELATED APPLICATION

The following U.S. patent application, commonly assigned to the assignee of the present invention, is incorporated by reference herein as if it had been fully set forth: Application Ser. No. 09/217,677, filed Dec. 21, 1998, and entitled LATERAL STRESS RELIEF MECHANISM FOR VACUUM BELLOWS.

FIELD OF THE INVENTION

The present invention relates generally to ion implantation equipment, and more specifically to an elastomeric sliding seal for a vacuum bellows in such equipment.

BACKGROUND OF THE INVENTION

Ion implantation has become a standard accepted technology of industry to dope workpieces such as silicon wafers or glass substrates with impurities in the large scale manufacture of items such as integrated circuits and flat panel displays. Conventional ion implantation systems include an ion source that ionizes a desired dopant element which is then accelerated to form an ion beam of prescribed energy. The ion beam is directed at the surface of the workpiece to implant the workpiece with the dopant element. The energetic ions of the ion beam penetrate the surface of the workpiece so that they are embedded into the crystalline lattice of the workpiece material to form a region of desired conductivity.

Ion energy is used to control junction depth in semiconductor devices. The energy levels of the ions that make up the ion beam determine the degree of depth of the implanted ions. High energy processes such as those used to form retrograde wells in semiconductor devices require implants of up to a few million electron volts (MeV), while shallow junctions may only demand energies below 1 thousand electron volts (1 keV).

A typical ion implanter comprises three sections or subsystems: (i) a terminal for outputting an ion beam, (ii) a beamline for mass resolving and adjusting the focus and energy level of the ion beam, and (iii) a target chamber which contains the semiconductor wafer to be implanted by the ion beam. The continuing trend to smaller and smaller semiconductor devices requires a beamline construction which serves to deliver high beam currents at low energies. The high beam current provides the necessary dosage levels, while the low energy levels permit shallow implants. Source/drain junctions in semiconductor devices, for example, require such a high current, low energy application.

Low energy ion beams which propagate through a given beamline construction suffer from a condition known as beam "blow-up", which refers to the tendency for like-charged ions within the ion beam to mutually repel each other. Such mutual repulsion causes a beam of otherwise desired shape to diverge away from an intended beamline path. Because the problem of beam blow-up increases with increasing beamline lengths, a design objective of preferred beamline constructions is to minimize or shorten the length of the beamline.

Typically, the target chamber is oriented generally perpendicularly with respect to the axis of the shortened beamline so that the ion beam strikes normal to the plane of the substrate. However, certain implants require the ion beam to strike the substrate at an orientation several degrees from normal. In order to permit such implants, the target chamber is made pivotable about the axis of the beam path. For example, a tilt-twist mechanism may be provided to allow pivoting in each of two perpendicular axes that generally lie in the plane of a substrate in the target chamber. An expansible bellows provides the interface between the beamline and the movable target chamber.

For applications where the bellows is required to move in simple axial compression or extension, no lateral forces are present, and the bellows corrugations can adequately handle the extensive or compressive forces in the axial direction. However, when the target chamber pivots with respect to the beamline path, the bellows typically experience shear forces in the plane perpendicular to the beam path. The bellows mounting is urged laterally within this plane (ie., the bellows mounting tends to undergo a lateral offset). Even small lateral movements in metal welded bellows may cause large shear stresses at mounting locations.

Fixedly mounting the bellows on both ends focuses these shear stresses in the plane perpendicular to the beam path (and parallel planes) at the locations of the fixed mountings. This shear stress may result in premature failure of the bellows by reducing the number of cycles in its lifetime. Because the implantation process is typically performed in a high vacuum (e.g., down to $1 \times 10^{-7}$ torr) process chamber to prevent dispersion of the ion beam and minimize the risk of contamination of the substrate by airborne particulates, any breach in the integrity of the bellows will result in loss of this vacuum condition. The loss of vacuum and the resulting contamination of the interior of the bellows will compromise the implantation process being performed.

It is an object of the present invention, then, to provide a means for alleviating the shear stress in a vacuum bellows. It is a further object of the present invention to provide an improved bellows for connecting two portions of an ion implanter that move with respect to each other. It is yet a further object of the invention to provide an elastomeric sliding seal for a bellows, including a bellows for use in an ion implanter.

SUMMARY OF THE INVENTION

An improved bellows is provided for use in, for example, an ion implanter. The bellows assembly comprises a first mounting portion located at one end of the bellows assembly for fixedly mounting the bellows assembly to a first vacuum chamber; a second mounting portion located at an opposite end of the bellows assembly for slidably mounting the bellows assembly to a second vacuum chamber; and a steel bellows located between the first and second mounting portions. The bellows extends generally along a longitudinal axis and is expansible and contractible along this axis. The second mounting portion permits radial slidable movement of the bellows assembly with respect to the second chamber in a first plane substantially perpendicular to this axis. The second mounting portion comprises a first sliding plate having a first wear plate, a second sliding plate having a second wear plate, and an elastomeric seal for maintaining a vacuum condition at the slidable mating surface provided between the first and second wear plates.

DETAILED DESCRIPTION OF PREFERRED EMBODIMENTS OF THE INVENTION

Figure 1:
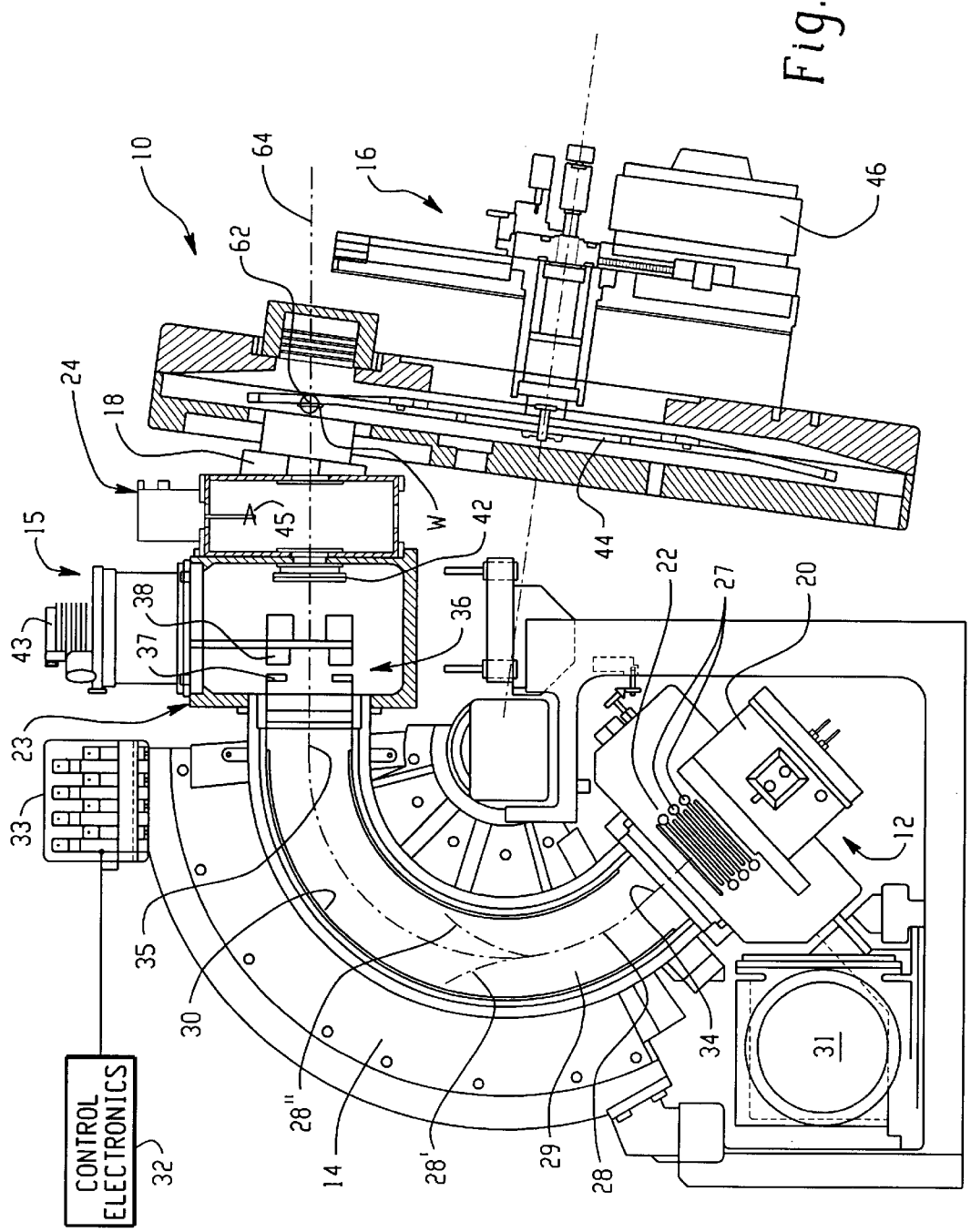
FIG. 1 is a plan view of an ion implanter into which the improved bellows of the present invention is incorporated.

Referring now to FIG. 1 of the drawings, an ion implanter, generally designated 10, is shown as comprising an ion source 12, a mass analysis magnet 14, a beamline assembly 15, and a target or end station 16. An expansible stainless steel bellows 18 assembly, which permits movement of the end station 16 with respect to the beamline assembly 15, connects the end station 16 and the beamline assembly. Although FIG. 1 shows an ultra low energy (ULE) ion implanter, the present invention has applications in other types of implanters as well. The invention also has applications in any vacuum environment wherein a bellows that couples two components must undergo more than simple axial compression or extension, without compromising the integrity of the vacuum.

The ion source 12 comprises a plasma chamber 20 and an ion extractor assembly 22. Energy is imparted to an ionizable dopant gas to generate ions within the plasma chamber 20. Generally, positive ions are generated, although the present invention is applicable to systems wherein negative ions are generated by the source. The positive ions are extracted through a slit in the plasma chamber 20 by the ion extractor assembly 22 which comprises a plurality of electrodes 27. The electrodes are charged with negative potential voltages, increasing in magnitude as the distance from the plasma chamber slit increases. Accordingly, the ion extractor assembly functions to extract a beam 28 of positive ions from the plasma chamber and accelerate the extracted ions into the mass analysis magnet 14.

The mass analysis magnet 14 functions to pass only ions of an appropriate charge-to-mass ratio to the beamline assembly 15, which comprises a resolver housing 23 and a beam neutralizer 24. The mass analysis magnet 14 includes a curved beam path 29 which is defined by an aluminum beam guide 30, evacuation of which is provided by a vacuum pump 31. The ion beam 28 that propagates along this path is affected by the magnetic field generated by the mass analysis magnet 14, to reject ions of inappropriate charge-to-mass ratio. The strength and orientation of this magnetic field is controlled by control electronics 32 which adjust the electrical current through the field windings of the magnet 14 through magnet connector 33.

The magnetic field causes the ion beam 28 to move along the curved beam path 29, from a first or entrance trajectory 34 near the ion source 12 to a second or exit trajectory 35 near the resolving housing 23. Portions 28' and 28" of the beam 28 comprised of ions having an inappropriate charge-to-mass ratio are deflected away from the curved trajectory and into the walls of aluminum beam guide 30. In this manner, the magnet 14 passes to the resolving housing 23 only those ions in the beam 28 which have the desired charge-to-mass ratio.

The resolver housing 23 includes a terminal electrode 37, an electrostatic lens 38 for focusing the ion beam, and a dosimetry indicator such as a Faraday flag 42. The beam neutralizer 24 includes a plasma shower 45 for neutralizing the positive charge that would otherwise accumulate on the target wafer as a result of being implanted by the positively charged ion beam 28. The beam neutralizer and resolver housings are evacuated by vacuum pump 43.

Downstream of the beam neutralizer 24 is the end station 16, which includes a disk-shaped wafer support 44 upon which wafers to be treated are mounted. The wafer support 44 resides in a target plane which is (generally) perpendicularly orientated to the direction of the implant beam. The disc shaped wafer support 44 at the end station 16 is rotated by motor 46. The ion beam thus strikes wafers mounted to the support as they move in a circular path. The end station 16 pivots about point 62 which is the intersection of the path 64 of the ion beam and the wafer W so that the target plane is adjustable about this point. In this manner, the angle of ion implantation may be slightly modified from the normal. The expansible bellows, shown in more detail in FIG. 2, permits this relative movement of the end station 16 and the beamline assembly 15. Bellows in the UIE environment must be compact to minimize the length of the beamline. As such, the number of expansible bellows corrugations is limited, as is its ability to absorb lateral shear stresses.

Figure 2:
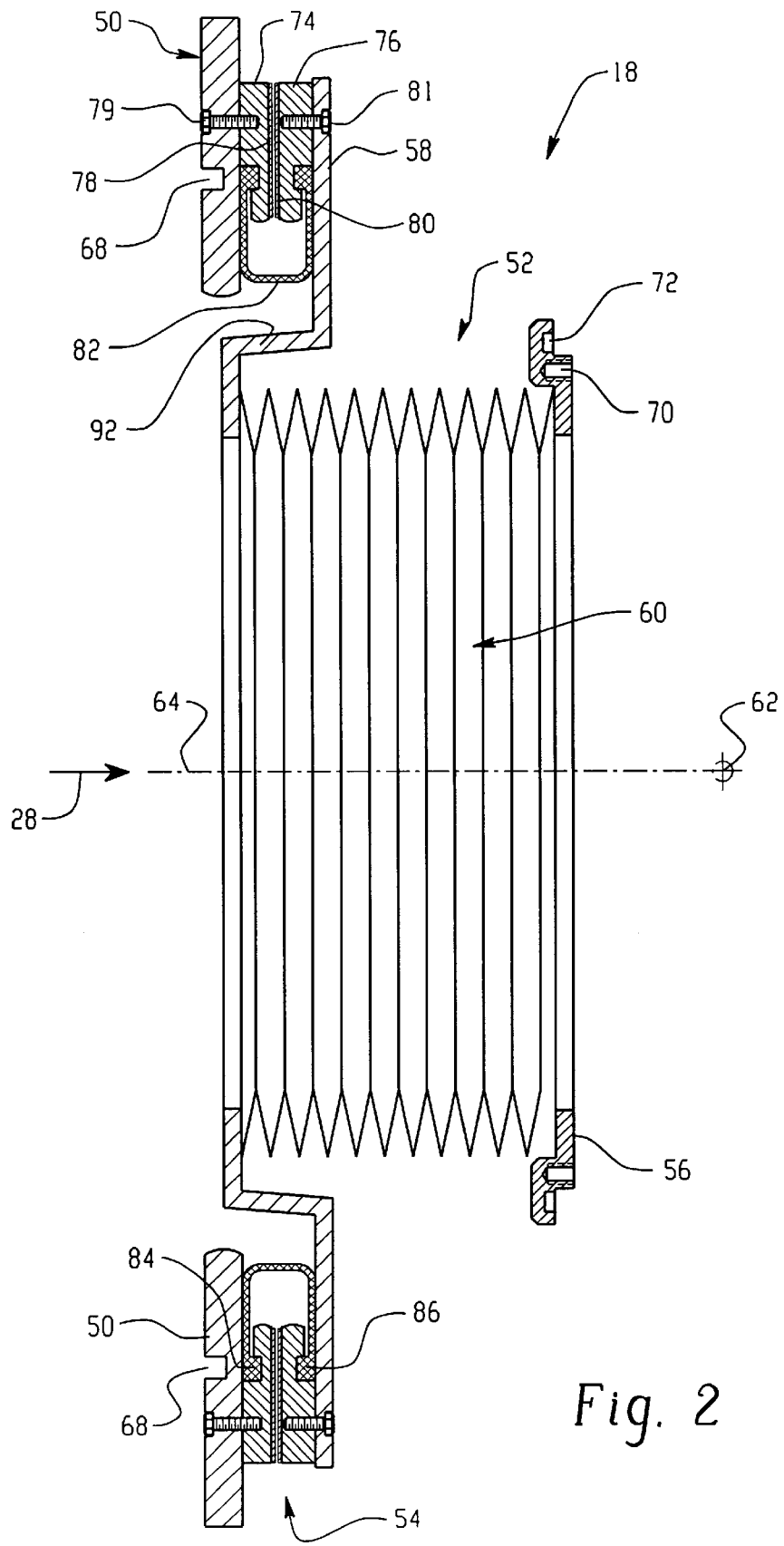
FIG. 2 is a cross sectional view of the implanter bellows shown in FIG. 1.

As shown in FIG. 2, the expansible bellows assembly 18 comprises a fixed mounting bracket 50, a bellows subassembly 52, and a sliding seal assembly 54. The bellows main assembly comprises an end station mounting bracket 56, a sliding seal mounting bracket 58, and a metal bellows 60 disposed therebetween. Although shown in cross section, the expansible bellows assembly 18 must be capable of maintaining a vacuum, and as such comprises an enclosed assembly, that is, the metal bellows 60 is generally cylindrical in shape, and the sliding seal assembly 54 and brackets 50, 56 and 58 are generally annular in shape.

Although the stiffness of the metal bellows is generally about 1200 lb./in., the bellows can pivot about pivot point 62 in the plane that is perpendicular to axis 64 along which the ion beam 28 travels. As shown in FIG. 1, point 62 is the intersection of the axis 64 and the plane of a wafer supported by the disc shaped wafer support 44. The disc shaped wafer support 44 is provided with tilt and twist mechanisms (not shown) which pivot the wafer support, respectively, about the two linear axes that define the plane normal to the axis 64. Pivoting the wafer support 44 about the point 62 causes lateral forces and resulting shear stresses to be exerted in this plane and parallel planes. The pivoting causes an arc to be swept equal to the pivot angle and the distance from point 62.

The fixed mounting bracket 50 may be provided with threaded bores (not shown) through which the bracket 50 may be bolted to the beam neutralizer housing. Alternatively, the mounting bracket may be integral with the beam neutralizer housing. Groove 68 is provided for a sealing element such as an elastomeric O-ring (not shown) to maintain a vacuum seal between the bellows assembly 18 and the beam neutralizer housing.

The end station mounting bracket 56 is provided with threaded bores 70 through which the bracket 56 may be bolted to the end station 16. Alternatively, the mounting bracket may be made integral with the end station. Groove 72 is provided for a sealing element such as an elastomeric O-ring (not shown) to maintain a vacuum seal between the bellows assembly 18 and the end station.

Located between the fixed mounting bracket 50 and the bellows subassembly 52 is the sliding seal assembly 54. The sliding seal assembly absorbs the lateral forces and resulting shear stresses exerted by the pivoting wafer support 44, which would otherwise need to be absorbed by the body of the bellows. The sliding seal assembly 54 comprises a first sliding plate 74, a second sliding plate 76, a first wear plate 78, a second wear plate 80, and an elastomeric seal 82. The wear plates are attached to their respective sliding plates or made integral therewith, and the first sliding plate/wear plate 74, 78 is secured to the fixed mounting bracket 50 by means of bolts 79. Similarly, the second sliding plate/wear plate 76, 80 is secured to the sliding seal mounting bracket 58 by means of bolts 81.

The sliding plates 74, 76, like the brackets 50, 56 and 58 are made of aluminum or steel that is ground flat. The wear plates 78, 80 are made of a material having a low coefficient of friction such as DLC (diamond-like carbon) which is applied to the ground steel or aluminum sliding plates 74, 76 by a vacuum plasma deposition process. The DLC provides a nearly frictionless, mirror-like hard and smooth slidable surface.

The elastomeric seal 82 is generally annular in shape, having a C-shaped cross section. The seal may be formed of a fluoroelastomer dipolymer, such as Viton® (type 9711), which is a registered trademark of the E. I. DuPont de Nemours and Company, Wilmington, Del. Portions of the seal 82 are disposed and captured between the sliding plates 74, 76 and their respective brackets 50, 58 by bolts 79, 81. Ridges or end portions 84, 86 of the seal 82 reside in grooves in their respective sliding plates 74, 76 to provide a vacuum tight seal and secure the position of the seal 82.

In operation, the end station 16 pivots about point 62 in the plane that is perpendicular to the beam axis 64. This plane is parallel to that formed by the interface of the wear plates 78, 80. The relative movement of the wear plates minimizes any lateral shear forces in the plane of the wear plate interface. Small lateral movements of up to 2 centimeters (cm) thereby prevent these lateral shear forces from being transmitted to the bellows subassembly 52. As such, the sliding seal assembly 54 permits true radial movement of the bracket 58 with respect to beam axis 64.

The use of an elastomeric seal such as Viton® between the fixed mounting bracket 50 and the bellows subassembly 52 permits such lateral movement without compromising the vacuum condition within the bellows. The Viton® can be easily replaced by removing bolts 79 and 81 when the interior of the bellows is brought up to atmospheric pressure.

The Viton® also minimizes particle generation within the vacuum. By fixing the elastomeric end of the bellows, and by making the bellows reentrant, the potential for an ion beam or other corrosive environment from attacking the elastomer is minimized. Specifically, because the elastomeric seal 82 is not within the direct line of sight of the ion beam, instead being obstructed by flange 92 in the sliding seal mounting bracket 58, the ion beam cannot degrade the seal. Further, the flange 92 prevents particles resulting from any other seal degradation from being transferred to the interior of the bellows.

Accordingly, a preferred embodiment of an improved bellows for an ion implanter has been described. With the foregoing description in mind, however, it is understood that this description is made only by way of example, that the invention is not limited to the particular embodiments described herein, and that various rearrangements, modifications, and substitutions may be implemented with respect to the foregoing description without departing from the scope of the invention as defined by the following claims and their equivalents.

What is claimed is:

1. A bellows assembly (18) comprising:
   a first mounting portion (56) located at one end of the bellows assembly for fixedly mounting the bellows assembly to a first chamber (16);
   a second mounting portion (54) located at an opposite end of the bellows assembly for slidably mounting the bellows assembly to a second chamber (15); and
   a bellows (60) located between said first and second mounting portions, said bellows extending generally along a longitudinal axis (64) and being expansible and contractible along said axis;
   said second mounting portion (54) permitting radial slidable movement of said bellows assembly with respect to said second chamber in a first plane substantially perpendicular to said axis (64), said second mounting portion (54) comprising a first sliding plate (74) having a first wear plate (78), and a second sliding plate (76) having a second wear plate (80), said wear plates adapted to provide a slidable mating surface therebetween.

2. The bellows assembly (18) of claim 1, wherein an interior of said bellows provides a vacuum chamber for maintaining a vacuum condition between said first and second chambers, and said second mounting portion (54) includes an elastomeric seal (82) for maintaining said vacuum.

3. The bellows assembly (18) of claim 2, wherein said elastomeric seal (82) is comprised of a fluoroelastomer dipolymer.

4. The bellows assembly (18) of claim 2, wherein said first mounting portion (56) lies in a second plane that is parallel to said first plane and pivots with respect to said second mounting portion 54 about a pivot point (62) along said axis (64).

5. The bellows assembly (18) of claim 2, wherein said bellows (60) is comprised of steel.

6. The bellows assembly (18) of claim 2, wherein said first sliding plate (74) is attached to said fixed mounting bracket (50), said second sliding plate (76) is attached to a slidable mounting bracket (58), and said elastomeric seal (82) has a first end that is captured between said first sliding plate (74) and said fixed mounting bracket (50), and an opposite end that is captured between said second sliding plate (76) and said slidable mounting bracket (58).

7. The bellows assembly (18) of claim 6, wherein said fixed mounting bracket (50) is provided with a seal to maintain vacuum conditions between said fixed mounting bracket and said second chamber (15), and said first mounting portion (56) is provided with a seal to maintain vacuum conditions between said first mounting portion and said first chamber (16).

8. The bellows assembly (18) of claim 6, wherein said slidable mounting bracket (58) is provided with a flange (92) that resides between said elastomeric seal (82) and said longitudinal axis (64) of the bellows (60).

9. The bellows assembly (18) of claim 2, wherein said first and second wear plates (78, 80) comprise a vacuum-deposited material having a low coefficient of friction.

10. A slidable bellows mounting (54) for slidably coupling a bellows assembly between two vacuum chambers, wherein the bellows assembly extends generally along a longitudinal axis (64) and is expansible and contractible along the axis, the mounting (54) comprising:
   a mounting portion (54) located on one end of the bellows assembly for slidably mounting the bellows assembly to a vacuum chamber (15) to permit radial slidable movement of the bellows assembly with respect to the vacuum chamber (15) in a first plane substantially perpendicular to said axis (64), said mounting portion (54) comprising a first sliding plate (74) having a first wear plate (78). and a second sliding plate (76) having a second wear plate (80), said wear plates adapted to provide a slidable mating surface therebetween, said mounting portion (54) further comprising an elastomeric seal (82) for maintaining vacuum.

11. The bellows mounting (54) of claim 10, wherein said elastomeric seal (82) is comprised of a fluoroelastomer dipolymer.

12. The bellows mounting (54) of claim 10, wherein said first sliding plate (74) is attached to a fixed mounting bracket (50), said second sliding plate (76) is attached to a slidable mounting bracket (58), and said elastomeric seal (82) has a first end that is captured between said first sliding plate (74) and said fixed mounting bracket (50), and an opposite end that is captured between said second sliding plate (76) and said slidable mounting bracket (58).

13. The bellows mounting (54) of claim 12, wherein said fixed mounting bracket (50) is provided with a seal to maintain vacuum conditions between said fixed mounting bracket and said vacuum chamber (15).

14. The bellows mounting (54) of claim 13, wherein said slidable mounting bracket (58) is provided with a flange (92) that resides between said elastomeric seal (82) and said longitudinal axis (64) of the bellows (60).

15. The bellows mounting (54) of claim 10, wherein said first and second wear plates (78, 80) comprise a vacuum-deposited material having a low coefficient of friction.

* * * * *